United States Patent [19]
Rice et al.

[11] Patent Number: 4,807,507
[45] Date of Patent: Feb. 28, 1989

[54] SELF-LUBRICATING HOLDER FOR SCROLL SAW BLADE

[75] Inventors: Verle L. Rice, Harrisonville, Mo. 64701; Richard A. Keener, Garden City, Mo.

[73] Assignee: Verle L. Rice, Harrisonville, Mo.

[21] Appl. No.: 167,197

[22] Filed: Mar. 11, 1988

[51] Int. Cl.[4] .............................................. B27B 19/02
[52] U.S. Cl. ........................................ 83/783; 83/169; 83/697; 83/698
[58] Field of Search ................. 83/169, 781, 782, 783, 83/746, 698, 697

[56] References Cited

U.S. PATENT DOCUMENTS

| | | | |
|---|---|---|---|
| 2,869,231 | 1/1959 | Gury | 83/169 X |
| 3,033,312 | 5/1962 | Enders | 83/169 X |
| 4,503,742 | 3/1985 | Sutton | 83/781 |

Primary Examiner—Donald Schran
Attorney, Agent, or Firm—Kokjer, Kircher, Bradley, Wharton, Bowman & Johnson

[57] ABSTRACT

The present invention relates to a saw blade holder for precision saws. Precision saws are designed to hold a saw blade between two parallel arms. Upper and lower blade holders mount the saw blade on the arms. The present invention relates to the lower blade holder and comprises two clamping elements which are designed to threadably engage and fit inside of a slotted tubular member. The blade passes through the slot in the tubular member and is clamped between the two clamping elements. The tubular member is comprised of a finely divided metal which has been shaped into the desired configuration utilizing a lubricant which is embedded throughout the thickness of the tubular sleeve. This lubricant is released over the lifetime of the tubular member so as to continually lubricate the wear points thus reducing wear and the adverse effects associated therewith.

2 Claims, 1 Drawing Sheet

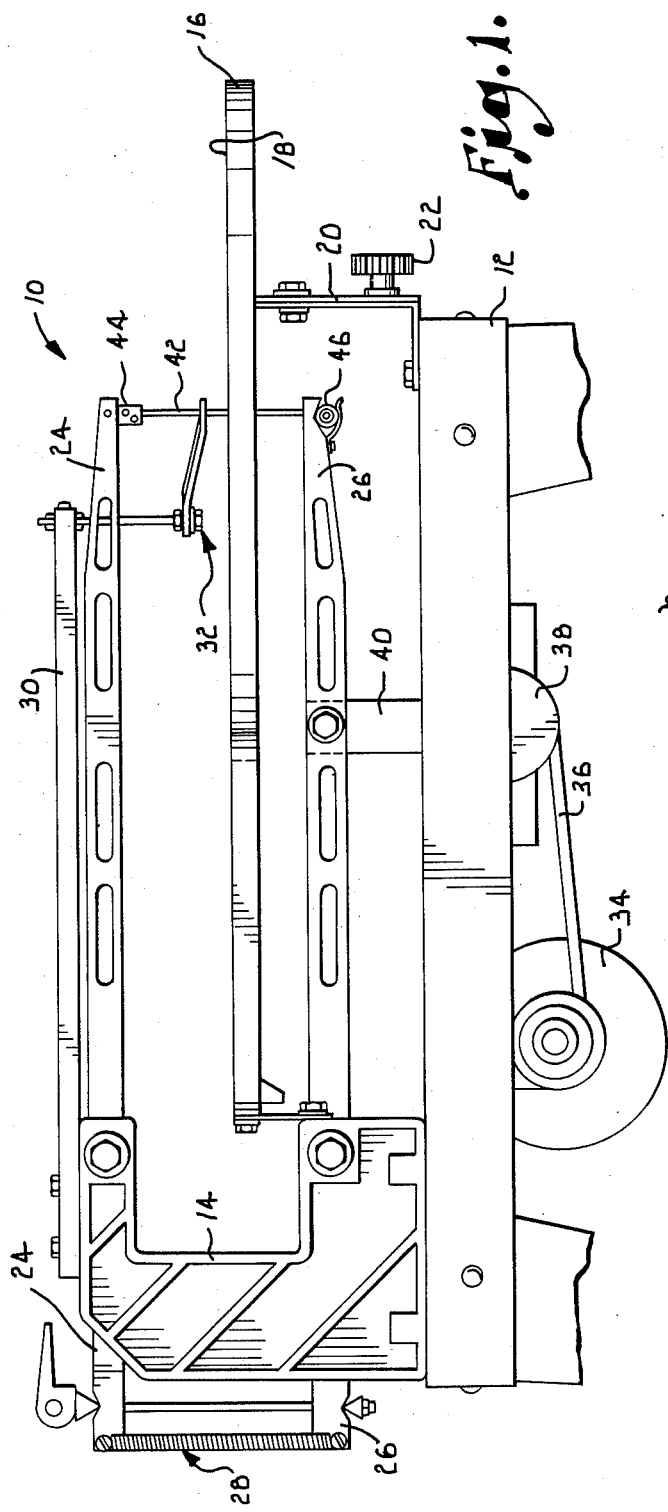
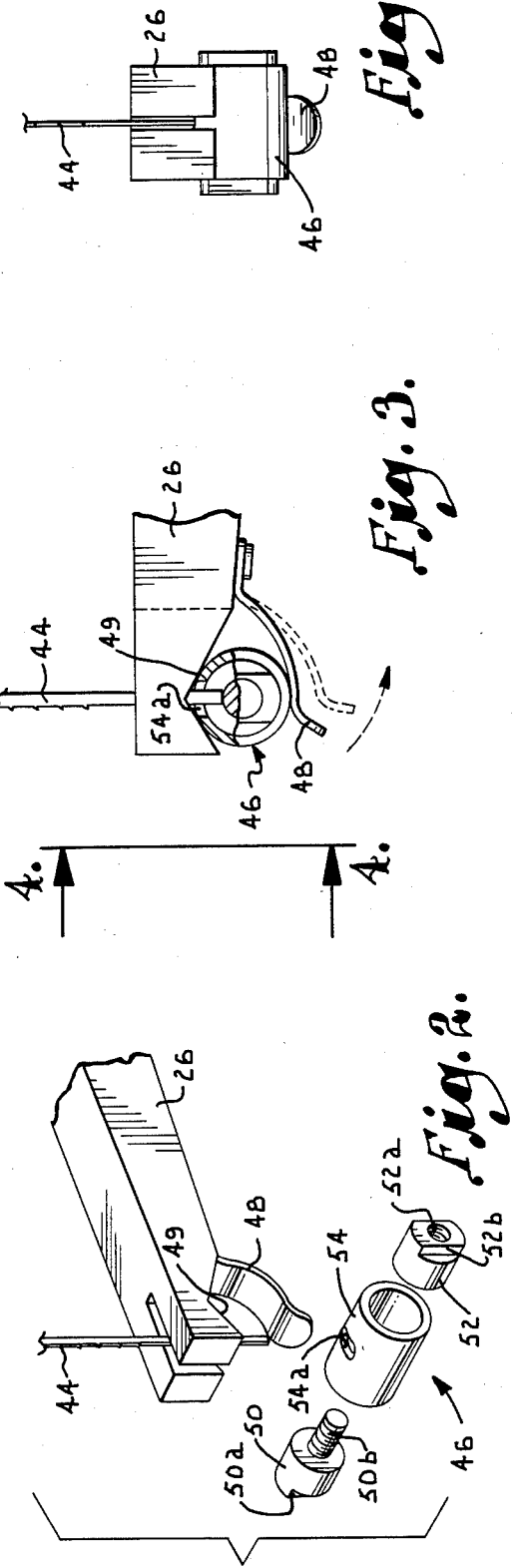

SELF-LUBRICATING HOLDER FOR SCROLL SAW BLADE

FIELD OF THE INVENTION

This invention relates generally to scroll saws and, more particularly, to an improved holder for mounting a scroll saw blade between the parallel arms of the saw.

BACKGROUND OF THE INVENTION

Scroll saws are widely used by amateur and professional woodworkers to cut finely detailed fret work and other intricate patterns. Modern scroll saws utilize parallel arms to mount the saw blade. The parallel arms may be mounted to a common c-arm for pivoting about a single axis or they may be designed as completely separate upper and lower arms which pivot in tandem above vertically aligned pivot pins.

The extremely thin blades utilized with scroll saws are susceptible to breakage and accordingly must be mounted in such a manner that they can be easily replaced when necessary. It is essential to keep the scroll saw blade under proper uniform tension so as to preclude excessive tension or undue blade flexing, either of which can result in poor cutting action and premature blade failure. With either a parallel arm saw or a c-arm saw, the saw blade must be able to pivot slightly relative to the saw arms in order for the blade to be moved rapidly in a rectilinear path without breakage during the sawing operation. Accordingly, it is well-known in the art to construct a blade holder for a scroll saw which will accommodate limited pivotal movement between the blade holder and the saw arms which mount it.

One particular type of blade holding system which has proven to be particularly effective in scroll saws includes a round or tapered blade clamp that seats in a v-shaped groove in the lower arm of the saw in combination with a pair of upper clamp blocks which are pinned to the end of the upper saw arm. Blade removal is carried out by releasing the tension adjustment at the back of the arms and loosening the screw which clamps the blade between the upper clamp blocks, thus permitting the blade to be withdrawn from beneath the lower saw arm.

With the foregoing described blade holder arrangement, the v-shaped groove in the bottom arm against which the rounded lower blade holder engages, minimizes the surface area in contact and accordingly the frictional energy losses. As the lower blade holder wears, the surface area in contact between the holder and the lower arm v-groove increases thereby increasing the frictional energy losses upon movement of the blade. This adversely effects operation of the saw in two respects. First, the increased friction and attendant increase in energy losses attributable to the contact between the blade holder and the saw arm is undesirable and adversely effects saw performance. Second, since the wearing of the blade clamp is very gradual over time, the fact that the frictional resistance is continuously and gradually increasing causes the performance of the saw to likewise vary over time thus making it more difficult for an operator to adjust to the saw performance than would be the case if the change occurred all at once and remained constant thereafter.

It is therefore a primary object of the present invention to provide a blade holder for a scroll saw blade which by its unique design including the ability to continuously emit lubricant over the life of the blade holder greatly reduces the wear on the blade holder and accordingly the adverse effects associated with the increased frictional resistance between the blade holder and the saw arm.

Another objective of our invention is to provide a scroll saw blade holder wherein by reducing the wear on the blade holder the frictional resistance between the blade holder and the saw arm is maintained more constant than with prior art devices thereby making saw performance more uniform over the useful life of the blade holder.

DETAILED DESCRIPTION OF THE DRAWINGS

In the drawings FIG. 1 is a side elevational view of a scroll saw of the type with which the present invention may be utilized;

FIG. 2 is an exploded perspective view of the blade holder according to the present invention;

FIG. 3 is an enlarged side elevational view of the blade holder shown in FIG. 2;

FIG. 4 is a vertical elevation looking in the directions of arrows 4—4 of FIG. 3.

A Precision saw of the type generally to which the present invention relates is shown and described in U.S. Pat. No. 4,503,742, issued Mar. 12, 1985. This patent is expressly incorporated herein by reference to the extent necessary to facilitate a full and complete understanding of the present invention.

Referring initially to FIG. 1, a scroll saw is designated generally by the numeral 10 and includes a four-legged platform table 12, the legs of which have been cut off in FIG. 1 in the interest of brevity in the drawings. Table 12 remounts a c-bracket 14 which in turn mounts a platform 16 that provides a working surface 18. Platform 16 is also partially supported by a depending bracket assembly 20 which includes an adjusting knob 22 for varying the horizontal tilt of the working surface.

Upper and lower parallel arms 24 and 26 are pivotally mounted on c-bracket 14. A tensioning mechanism is designated generally by the numeral 28 and is used to maintain a uniform tension on the upper and lower arms. The particular tensioning mechanism shown is described in detail in U.S. Pat. No. 4,724,735, issued Feb. 16, 1988, which is incorporated herein by reference.

A stationary extension arm 30 extends from c-bracket 14 over work surface 18 and mounts a workpiece holder designated generally by the numeral 32. An electric motor 34 drives the saw arms through belt 36, pulley 38 and drive linkage 40.

Held between upper and lower saw arms 24 and 26 is a precision saw blade 42 which is mounted by upper and lower and blade holders 44 and 46. The lower blade holder 46 is partially supported by a leaf spring 48 which is secured to lower arm 26 beneath a v-shaped groove 49.

The upper blade holder 44 comprises a pair of rectangular clamping blocks which are supported by a pivot pin on upper arm 24 and are held together by a set screw. The upper blade holder is of the same general type as those well-known in the art and does not form any part of the present invention.

The lower blade holder 46 will now be described in greater detail. The lower blade holder comprises first and second clamping elements 50 and 52 as well as tubular member 54. Clamping elements 50 and 52 have been used as lower blade holders in prior art constructions, but not in combination with tubular member 54. Clamping element 50 comprises a solid body having a rounded exterior with wrench flats 50a at one end and a threaded stud 50b projecting from the other end. Clamping element 52 also comprises a solid body having a rounded exterior with a threaded through opening 52a and wrench flats 52b. Manifestly, threaded opening 52a is sized to receive threaded stud 50b. Both clamping elements 50 and 52 have an exterior diameter fractionally smaller than the interior diameter of tubular member 54 so that the former may be received within the latter. When the clamping elements 50 and 52 are positioned within tubular member 54 the lower end of blade 44 is inserted through a slotted opening 54a in tubular member 54 and then against one of the mating faces of clamping elements 50 and 52. The clamping elements are then tightened together so as to firmly hold blade 44 there between. Slot 54a which is of generally elongated configuration accommodates limited movement of the blade and clamping elements 50 and 52 relative to tubular member 54.

Tubular member 54 is constructed from finely ground or pulverized metal which has been compressed into the desired shape with a lubricating material. Bearings of this type are well-known in the art for other applications but have never previously been employed as a component of a scroll saw blade holder.

When the device of the present invention is utilized to hold blade 44 during the sawing operation, the blade holder will assume the position illustrated in FIG. 3. The v-shaped groove 49 of lower arm 26 minimizes the area of contact with the rounded external surface of tubular member 54. While tubular member 54 and clamping elements 50 and 52 are generally designed to move in unison, pivotal movement between the two is accommodated by slot 54a. The fact that sleeve 54 is impregnated with a lubricant which is continually emitted greatly reduces wear on the blade holder, thus reducing adverse performance attributable to increased frictional resistance and also assuring that the performance of the saw will remain relatively constant over the life of the blade holder 46. Thus, a blade holder is provided which offers the same quick change features as constructions of the prior art while greatly increasing the useful life of the blade holder, reducing frictional resistance between the blade holder and the saw arm and promoting uniform operation of the saw even after long usage.

At any time that it is necessary to replace blade 44 clamping elements 50 are separated and if necessary the blade holder is separated from arm 26 by bending leaf spring 48 into the position shown in phantom FIG. 3. A new blade can then be inserted and the blade holder replaced to its operating position as shown in solid lines in FIG. 3.

It should be emphasized that the blade holder of the present invention can be utilized with any precision type saw including those saws of the type shown in the drawings herein or c-arm saws which have two arms mounted for pivotal movement about a single axis. Various modifications and adaptations of the invention may be made without departing from the scope thereof which is intended to be limited only by the appended claims.

Having thus described the invention, what is claimed is:

1. A saw having upper and lower parallel arms, a saw blade positioned between said arms for rectilinear movement, and means for holding one end of said blade on one of said arms, the improvement comprising:
    releasable means for holding the other end of said blade on the other arm; and
    an open-ended tubular member for receiving said releasable holding means,
    said tubular member having a slot for said blade,
    said tubular member being characterized by the ability to release lubricant over the useful life of said member.

2. A precision saw blade holder comprising:
    opposed complemental clamping elements for releasably clamping a saw blade therebetween; and
    an open-ended tubular member for receiving said clamping elements,
    said tubular member having a slot for receiving a saw blade clamped between said elements,
    said member accommodating movement of said elements when the latter are placed within it and having the ability to release lubricant over the useful life of said member.

* * * * *